O. J. STICKLES.
Milk-Cooling Apparatus.

No. 159,854.

Patented Feb. 16, 1875.

WITNESSES:
E. Wolff
A. F. Terry

INVENTOR:
Orin J. Stickles
BY
ATTORNEYS

UNITED STATES PATENT OFFICE.

ORRIN J. STICKLES, OF CANTON, NEW YORK.

IMPROVEMENT IN MILK-COOLING APPARATUS.

Specification forming part of Letters Patent No. 159,854, dated February 16, 1875; application filed January 18, 1875.

*To all whom it may concern:*

Figure 1:
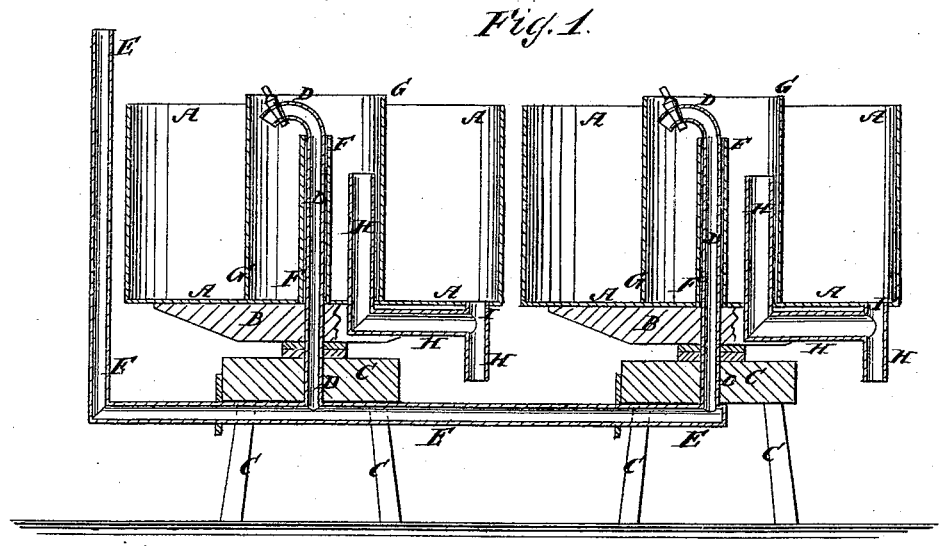
Figure 2:
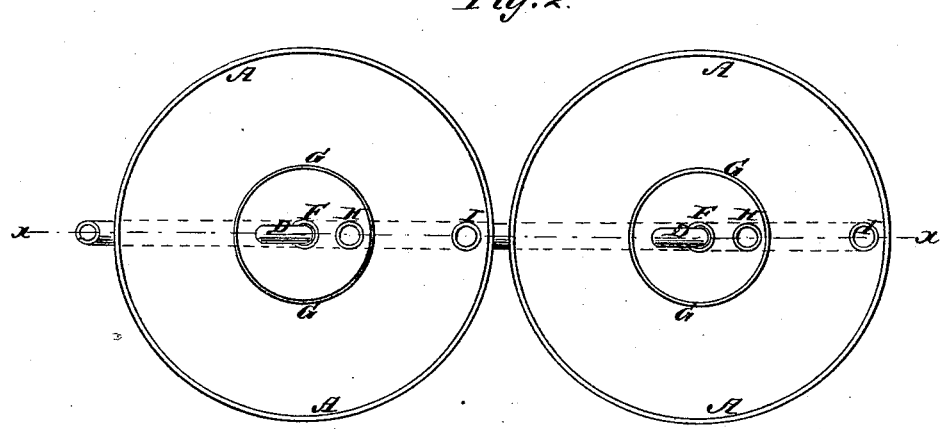

Be it known that I, ORRIN J. STICKLES, of Canton, St. Lawrence county, New York, have invented a new and useful Improvement in Milk-Coolers, of which the following is a specification:

Figure 1 is a vertical section of my improved milk-cooler, taken through the line $x\ x$, Fig. 2; and Fig. 2 is a top view of the same.

Similar letters of reference indicate corresponding parts.

My invention has for its object to furnish a simple, convenient, inexpensive, and effective apparatus for cooling milk, and which shall be so constructed as to be easily cleaned in all its parts. The invention consists in the concentric tanks or pans, the central tube, the waste-pipe, the pivoted base, the discharge-pipe, and the pivoting inlet-pipe, in combination with each other, and with the water-pipe and the bench or support, as hereinafter fully described.

A represents a pan or tank, made of tin or other suitable material, and of any desired size. The pan A may be made round, or in any other desired shape, and rests upon a base, B, which may be a disk or a number of radial arms, secured to each other at a common center. The base B rests upon a bench, C, or other suitable support, to which it is pivoted by a pipe, D, the lower end of which is connected with a water-pipe, E, which passes beneath, and is secured to, the bench C. The pipe D passes up through the center of the base B, and through a tube, F, the lower end of which is secured to the center of the bottom of the pan A. The upper end of the pipe D is made detachable, is bent over, and is provided with a stop-cock, to enable the flow of water to be graduated, as desired. G is a tube or tank, made concentric with the pan A and tube F, and should be a little higher, and about one-third the diameter of the said pan A. H is a waste-pipe, which passes up through the bottom of the pan A within the inner pan G, and the upper end of which is a little lower than the top of the pipe D and tank G, so that the said tank can never overflow into the milk.

The tank A may also be provided with a discharge-pipe, I, leading out through its bottom, and the lower end of which may be connected with the lower part of the waste-pipe H.

When the apparatus is made large the pan A may have a hole in its bottom within the tank G, closed with a valve or other stopper, for convenience in washing it out, but which hole is not necessary when the apparatus is made small.

Any desired number of pans and tubes may be arranged in a series, and connected by the same water-pipe E.

By this arrangement cold water may be allowed to flow into and stand in the inner tank G, or a stream of cold water may be allowed to flow continuously through the tank G; or ice may be put into the said tank G.

By this apparatus the milk in contact with the cold walls of the tank G will become cold, will sink and be replaced by the warmer particles, thus establishing a circulation that will soon cool the entire mass of the milk, however large the tank or pan A may be.

Having thus described my invention, I claim as new, and desire to secure by Letters Patent—

The concentric tanks or pans A G, the central tube F, the waste-pipe H, the discharge-pipe I, the pivoted base B, and the pivoting-pipe D, in combination with each other, and with the water-pipe E and the bench or support C, substantially as herein shown and described.

ORRIN J. STICKLES.

Witnesses:
GEO. R. JEWETT,
WORTH CHAMBERLIN.